W. COLER.
Pipe-Coupling.

No. 214,991.        Patented May 6, 1879.

Witnesses:
E. J. Howard
L. D. Watters.

Inventor
William Coler
by Humphrey & Stuart
Attys.

UNITED STATES PATENT OFFICE.

WILLIAM COLER, OF AKRON, OHIO, ASSIGNOR OF ONE-HALF HIS RIGHT TO JOHN ROBB, OF SAME PLACE.

IMPROVEMENT IN PIPE-COUPLINGS.

Specification forming part of Letters Patent No. 214,991, dated May 6, 1879; application filed March 13, 1879.

*To all whom it may concern:*

Be it known that I, WILLIAM COLER, of Akron, in the county of Summit and State of Ohio, have invented a new and useful Improvement in Pipe-Couplings, of which the following is a specification.

My invention has relation to the joining of pipes or tubes of different sizes or different material, and especially the connecting of feed-water pipes with urinal-basins, water-closets, hoppers, &c., as well as tubes with bottle-necks for chemists' and druggists' use, and generally such connections as cannot be screwed or soldered.

Heretofore such connections have been made by the use of fibrous material, as flax, hemp, &c., and plastic material or cement, as putty, white lead, plaster-of-paris, and the like, either singly or in combination. The objections to such connections are that their construction is slow, laborious, and unclean; the coupling is inflexible and liable to leak; their removal is difficult, and destroys them when it is desired to separate the pipes.

The object of my invention is to provide a coupling which shall be clean, easily applied, flexible, secure at all times, and which can be removed and replaced at will without injury.

To that end it consists of a collar composed of flexible rubber, the two halves wherof, of different internal diameters, are adapted to slide upon and tightly grasp the respective pipes to be joined.

It also consists in projecting from the center of said collar, within the larger half, a continuation of the smaller half, adapted to be compressed between the outside of the smaller pipe and the interior of the large pipe; and it finally consists in causing said continuation to gradually thicken toward the outer end.

Figure 1:
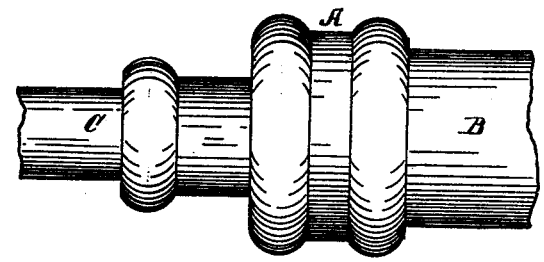
Figure 2:
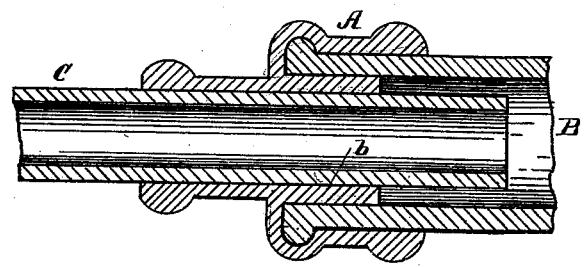

In the accompanying drawings, Figure 1 is an elevation of my improved coupling connecting two pipes; Fig. 2, a longitudinal central section of the same; and Fig. 3, a similar section of the coupling removed.

Figure 3:
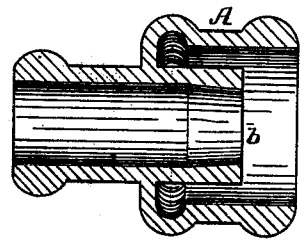

In operation, the coupling A is first slipped upon the large pipe, B, the inwardly-projecting tube $b$ fitting within the interior thereof. This tube $b$, or continuation of the smaller half of the collar A, is of even diameter without, but within converges slightly toward the end, as shown in Fig. 3, rendering it thicker at that point. The smaller pipe, C, is then inserted, and compresses the tube $b$ between its exterior and the interior of the pipe B, forming a tight packing, which is insured by the increased thickness of the end of said tube.

I am aware that to use a section of flexible tubing of even diameter to connect pipes is not new, and such is not my invention; but

What I claim is—

1. A pipe-coupling of vulcanized rubber, the two halves whereof are of different diameters, adapted to slide upon and grasp the respective pipes, substantially as shown.

2. A pipe-coupling of vulcanized rubber, having its two halves of different diameters, adapted to slide upon and grasp the respective pipes, and having a tube projecting from the center within the larger half, adapted to be compressed between the outside of the smaller and inside of the larger pipe, substantially as and for the purpose hereinbefore set forth.

3. A pipe-coupling of vulcanized rubber, with its two halves of different diameters, adapted to slide upon and grasp the respective pipes, and having a tube of increased thickness toward its outer end projecting from the center within the larger half, adapted to be compressed between the outside of the smaller and inside of the larger pipes, substantially as and for the purpose hereinbefore set forth.

In testimony that I claim the foregoing I have hereunto set my hand this 8th day of March, A. D. 1879.

WILLIAM COLER.

Witnesses:
C. P. HUMPHREY,
E. W. STUART.